(12) United States Patent
Wang et al.

(10) Patent No.: US 11,533,380 B2
(45) Date of Patent: Dec. 20, 2022

(54) METHODS AND APPARATUSES FOR INTERNET CONTENT PUSHING SERVICE IN A WIRELESS MOBILE COMMUNICATION SYSTEM

(71) Applicant: NOKIA TECHNOLOGIES OY, Espoo (FI)

(72) Inventors: He Wang, Shanghai (CN); Wenyi Xu, Shanghai (CN); Liyu Cai, Shanghai (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 133 days.

(21) Appl. No.: 17/253,315

(22) PCT Filed: Jun. 25, 2018

(86) PCT No.: PCT/CN2018/092686
§ 371 (c)(1),
(2) Date: Dec. 17, 2020

(87) PCT Pub. No.: WO2020/000144
PCT Pub. Date: Jan. 2, 2020

(65) Prior Publication Data
US 2021/0274009 A1    Sep. 2, 2021

(51) Int. Cl.
*H04L 67/55*    (2022.01)
*H04W 4/06*    (2009.01)
(Continued)

(52) U.S. Cl.
CPC .............. *H04L 67/55* (2022.05); *H04W 4/06* (2013.01); *H04W 4/20* (2013.01); *H04W 28/06* (2013.01); *H04W 72/1257* (2013.01)

(58) Field of Classification Search
CPC .......... H04L 67/55; H04W 4/06; H04W 4/20; H04W 28/06; H04W 72/1257
See application file for complete search history.

(56) References Cited

U.S. PATENT DOCUMENTS

2009/0296657 A1* 12/2009 Omar et al. .......... H04W 36/00
2010/0268599 A1    10/2010 Montesdeoca
(Continued)

FOREIGN PATENT DOCUMENTS

CN    1554060 A    12/2004
CN    104012125 A    8/2014
(Continued)

OTHER PUBLICATIONS

Extended European Search Report dated Dec. 23, 2021 corresponding to European Patent Application No. 18924116.9.
(Continued)

*Primary Examiner* — Ronald Eisner
(74) *Attorney, Agent, or Firm* — Squire Patton Boggs (US) LLP

(57) ABSTRACT

Embodiments of the present disclosure provide methods, apparatuses and computer program for content pushing service in a wireless mobile communication system. In one embodiment, the method comprises receiving a proactive pushing service request from an internet content provider; determining, for the proactive pushing service request, a proactive pushing strategy based on auxiliary information predetermined for network optimization processing; and sending, to at least one network element in the wireless mobile communication system, a command for the proactive pushing service so that at least a part of internet contents designated by the proactive pushing service request are proactively pushed to one or more users based on the determined proactive pushing strategy.

12 Claims, 8 Drawing Sheets

(51) Int. Cl.
*H04W 4/20* (2018.01)
*H04W 28/06* (2009.01)
*H04W 72/12* (2009.01)

(56) References Cited

U.S. PATENT DOCUMENTS

2011/0029598 A1* 3/2011 Arnold et al. .......... G06F 15/16
2017/0324807 A1 11/2017 Gu et al.

FOREIGN PATENT DOCUMENTS

| CN | 104471904 A | 3/2015 |
| CN | 105246054 A | 1/2016 |
| CN | 105282227 A | 1/2016 |
| CN | 105656997 A | 6/2016 |
| EP | 1 853 027 A1 | 11/2007 |

OTHER PUBLICATIONS

International Search Report and Written Opinion dated Mar. 13, 2019 corresponding to International Patent Application No. PCT/CN2018/092686.
First Examination Report dated Jan. 27, 2022 corresponding to Indian Patent Application No. 202147001447.
First Office Action dated Aug. 17, 2022 corresponding to Chinese Patent Application No. 201880096860.6, with English summary.

* cited by examiner

METHODS AND APPARATUSES FOR INTERNET CONTENT PUSHING SERVICE IN A WIRELESS MOBILE COMMUNICATION SYSTEM

TECHNICAL FIELD

The non-limiting and example embodiments of the present disclosure generally relate to a technical field of wireless communications, and specifically to methods, apparatuses and computer programs for internet content pushing service in a wireless mobile communication system.

BACKGROUND

This section introduces aspects that may facilitate a better understanding of the disclosure. Accordingly, the statements of this section are to be read in this light and are not to be understood as admissions about what is in the prior art or what is not in the prior art.

Today the mobile Internet application has integrated deeply into our daily life. Pervasive smart terminals with capability to connect anything anywhere at any-time provide a variety of services to improve the convenience of people's life and user experience. Therefore, resource-intensive and Over-The-Top (OTT) applications, such as mobile video service, are very important and serving as a big part of the Internet applications. Particularly, the video based mobile applications such as mobile Video on-Demand (mVoD, unlike conventional video broadcast or digital TV), online social media, OTT video clips (user demand or interest in personalized and non-popular content) and etc., bring the unprecedented increase of the wireless data traffic in the wireless mobile communication network.

In addition, a variety of such similar new services are emerging in an endless stream and the resulting wireless data traffic is also experiencing tremendous growth. All these lead to the confliction between the capacity of the wireless link, radio access network, core network, mobile backhaul and the explosion of growing traffic.

SUMMARY

Therefore, there is a need for solutions to cope with the challenge of rapidly explosive growth in mobile traffic by mobile internet content services with the scarce spectrum of the air interface.

To solve at least part of the above problem, methods, apparatuses and computer programs are provided in the present disclosure. It can be appreciated that embodiments of the present disclosure are not limited to 5G scenario, but could be more widely applied to any application scenario where similar problems exist.

Various embodiments of the present disclosure mainly aim at providing methods, apparatuses and computer programs for internet content pushing service. Other features and advantages of embodiments of the present disclosure will also be understood from the following description of specific embodiments when read in conjunction with the accompanying drawings, which illustrate, by way of example, the principles of embodiments of the present disclosure.

According to a first aspect of the present disclosure, there is provided a method implemented in a wireless mobile communication system. The method comprises: receiving a proactive pushing service request from an internet content provider; determining, for the proactive pushing service request, a proactive pushing strategy based on auxiliary information predetermined for network optimization processing; and sending, to at least one network element in the wireless mobile communication system, a command for the proactive pushing service so that at least a part of internet contents designated by the proactive pushing service request are proactively pushed to one or more users based on the determined proactive pushing strategy.

According to a second aspect of the present disclosure, there is provided a method implemented in a wireless mobile communication system. The method comprises: receiving, from a mobile network operation data analyzing engine, a command for a proactive pushing service; proactively pushing at least a part of internet contents to one or more users based on the command for the proactive pushing service. The command is in compliance with a proactive pushing strategy determined based on auxiliary information predetermined for network optimization processing.

According to a third aspect of the present disclosure, there is provided a method implemented at an internet content provider. The method comprises: caching internet contents to one or more cache servers in a wireless mobile communication system; sending, to a mobile network operation data analyzing engine of the wireless mobile communication system, a proactive pushing service request to initiate a proactive pushing service.

According to a fourth aspect of the present disclosure, there is provided a mobile network operation data analyzing engine in a wireless mobile communication system. The mobile network operation data analyzing engine comprises: a receiving unit, configured to receive a proactive pushing service request a from an internet content provider; a determining unit, configured to determine, for the proactive pushing service request, a proactive pushing strategy based on auxiliary information predetermined for network optimization processing; and a sending unit, configured to send, to at least one network element in the wireless mobile communication system, a command for the proactive pushing service so that at least a part of internet contents designated by the proactive pushing service request are proactively pushed to one or more users based on the determined proactive pushing strategy.

According to a fifth aspect of the present disclosure, there is provided a network device in a wireless mobile communication system. The network device comprises: a receiving unit, configured to receive, from a mobile network operation data analyzing engine, a command for a proactive pushing service; a communication unit, configured to proactively push at least a part of internet contents to one or more users based on the command for the proactive pushing service. The command is in compliance with a proactive pushing strategy determined based on auxiliary information predetermined for network optimization processing.

According to a sixth aspect of the present disclosure, there is provided a device implemented at an internet content provider. The device comprises: a caching unit, configured to cache internet contents to one or more cache servers in a wireless mobile communication system; a sending unit, configured to send, to a mobile network operation data analyzing engine of the wireless mobile communication system, a proactive pushing service request to initiate a proactive pushing service.

According to a seventh aspect of the present disclosure, there is provided a network device. The network device comprises a processor and non-transitory machine readable storage medium. The non-transitory machine readable storage medium contains instructions that, when executed on the processor, cause the network device to perform the method according to an embodiment of the first aspect of the present disclosure.

According to an eighth aspect of the present disclosure, there is provided a network device. The network device comprises a processor and non-transitory machine readable storage medium. The non-transitory machine readable storage medium contains instructions that, when executed on the processor, cause the network device to perform the method according to an embodiment of the second aspect of the present disclosure.

According to a ninth aspect of the present disclosure, there is provided a device of an internet content provider. The device comprises a processor and a non-transitory machine readable storage medium, the non-transitory machine readable storage medium containing instructions that, when executed on the processor, cause the network device to perform the method according to an embodiment of the third aspect of the present disclosure.

According to a tenth aspect of the present disclosure, there is provided a computer program. The computer program comprises instructions which, when executed on one or more processors, cause the one or more processors to carry out the method of an embodiment of the first aspect of the present disclosure.

According to an eleventh aspect of the present disclosure, there is provided a computer program. The computer program comprises instructions which, when executed on one or more processors, cause the one or more processors to carry out the method of an embodiment of the second aspect of the present disclosure.

According to a twelfth aspect of the present disclosure, there is provided a computer program. The computer program comprises instructions which, when executed on one or more processors, cause the one or more processors to carry out the method of an embodiment of the third aspect of the present disclosure.

According to a thirteenth aspect of the present disclosure, there is provided an apparatus. The apparatus comprises: a service subscribing interface configured to subscribe a proactive pushing service from an internet content provider; and a receiving unit configured to receive at least a part of internet contents via the proactive pushing service, where the at least part of internet contents of the proactive pushing service are processed and transmitted based on an embodiment of the first aspect of the present disclosure.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
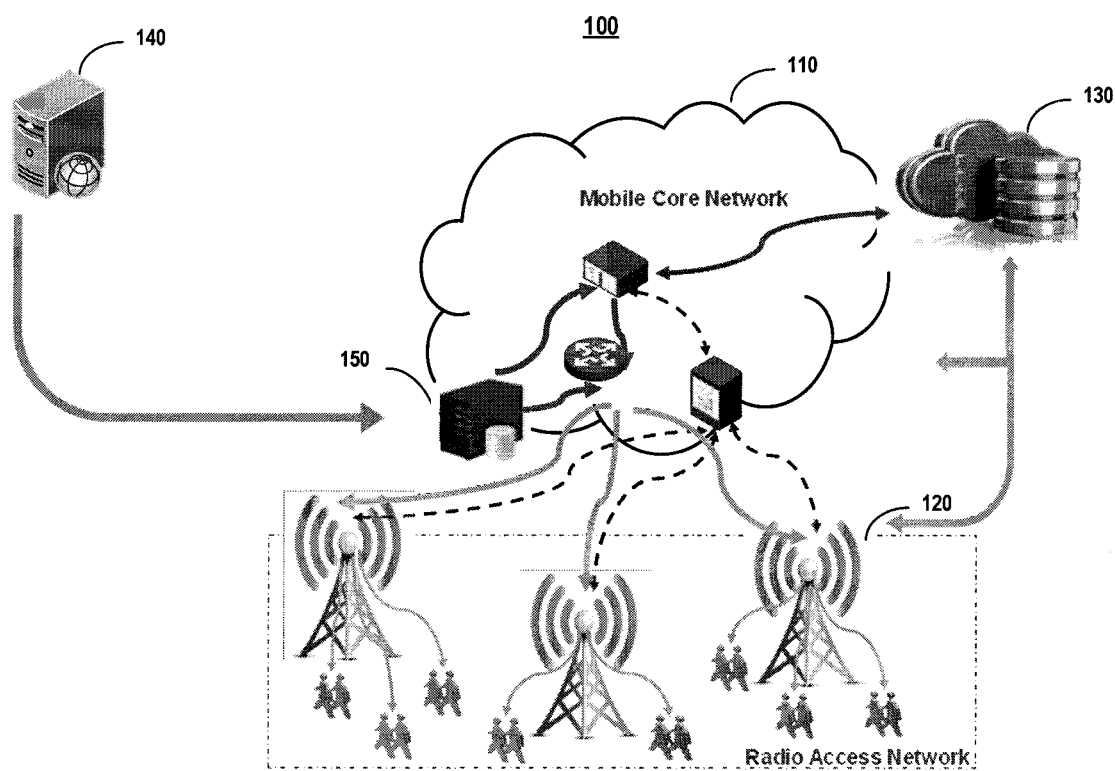
FIG. 1 illustrates an example wireless communication network 100 in which embodiments of the disclosure may be implemented.

Hereinafter, the principle and spirit of the present disclosure will be described with reference to illustrative embodiments. It should be understood, all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment," "an embodiment," "an example embodiment," etc. indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a "first" element could also be referred to as a "second" element, and similarly, a "second" element could also be referred to as a "first" element, without departing from the scope of example embodiments. As used herein, the term "and/or" includes any and all combinations of one or more of the associated listed items.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

As used herein, the term "wireless mobile communication network" refers to a network following any suitable wireless communication standards, such as LTE-Advanced (LTE-A), LTE, Wideband Code Division Multiple Access (WCDMA), High-Speed Packet Access (HSPA), and so on. Furthermore, the communications between network devices in the wireless communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future.

As used herein, the term "network device" refers to a device in a wireless communication network via which a terminal device accesses the network and receives services therefrom. The network device may refer to a base station (BS) or an access point (AP), for example, a node B (NodeB or NB), an evolved NodeB (eNodeB or eNB), a Remote Radio Unit (RRU), a radio header (RH), a remote radio head (RRH), a relay, a low power node such as a femto, a pico, and so forth, depending on the applied terminology and technology.

Yet further examples of network device include multi-standard radio (MSR) radio equipment such as MSR BSs, network controllers such as radio network controllers (RNCs) or base station controllers (BSCs), base transceiver stations (BTSs), transmission points, transmission nodes, Broadcast and Multicast Service Centre (BMSC), core network nodes (e.g., MSCs, MMEs), O&M nodes, OSS nodes, SON nodes, positioning nodes (e.g., E-SMLCs), and/or MDTs. More generally, however, network device may represent any suitable device (or group of devices) capable, configured, arranged, and/or operable to enable and/or provide a terminal device access to the wireless mobile communication network or to provide some service to a terminal device that has accessed the wireless mobile communication network.

The term "terminal device" refers to any end device that can access a wireless communication network and receive services therefrom. By way of example and not limitation, a terminal device may be referred to as user equipment (UE), a Subscriber Station (SS), a Portable Subscriber Station, a Mobile Station (MS), or an Access Terminal (AT). The terminal device may include, but not limited to, a mobile phone, a cellular phone, a smart phone, a tablet, a wearable device, a personal digital assistant (PDA), portable computers, image capture terminal devices such as digital cameras, gaming terminal devices, music storage and playback appliances, wearable terminal devices, vehicle-mounted wireless terminal devices and the like. In the following description, the terms "terminal device", "terminal", "user equipment" and "UE" may be used interchangeably.

The terminal device may support device-to-device (D2D) communication, for example by implementing a 3GPP standard for sidelink communication, and may in this case be referred to as a D2D communication device.

As used herein, the term "circuitry" may refer to one or more or all of the following:
(a) hardware-only circuit implementations (such as implementations in only analog and/or digital circuitry) and
(b) combinations of hardware circuits and software, such as (as applicable): (i) a combination of analog and/or digital hardware circuit(s) with software/firmware and (ii) any portions of hardware processor(s) with software (including digital signal processor(s)), software, and memory (ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In order to solve or at least alleviate the confliction between the capacity of the wireless mobile communication system and the growing traffic of the variety of new services, a lot of research work have been done with the common viewpoint that an important portion of mobile multimedia traffic comes from the duplicate downloads of a few same large size multimedia contents which would consume a lot of network resource. Caching technique, i.e., pre-storing popular reusable information at the mobile edge server to reduce the load at the backhaul, may be adopted to avoid the redundancy transmission of such duplicated contents.

The caching strategy is usually designed for the backhaul saving. Caching at the mobile edge server which is closer to the end user would benefit to the service providing in the manner of latency, energy and efficiency. The mobile users can get their expected contents from the cache server by using Selected IP Traffic Offload (SIPTO). This has a significant benefit to ease the backhaul traffic. In this regard, Big Data Analysis (BDA) and Artificial Intelligence (AI) method can be introduced to determine the proper cacheable contents and appropriate cache location.

In fact, besides the backhaul resources, the air interface resources also need to be further optimized. According to present disclosure, there is provided a solution of proactive pushing internet contents in a wireless mobile communication system to optimize the air interface transmission and improve the radio resource usage and user experience. Embodiments described here focus on how to efficiently transmit the cached content data to the target user, which would benefit to the three participants: Internet Content Providers (ICPs), Mobile Network Operators (MNOs), and the End Users, i.e., improving the spectrum efficiency for the MNO, improving the user experience for the End User, and improving the user viscosity for ICP.

With reference to FIGS. 1-12, various embodiments of the present disclosure are described in more details. In order to facilitate the understanding, the embodiments of the present disclosure are described in the context of mVoD services/applications. Those skilled in the art can, however, appreciate that the proactive pushing solutions of the present disclosure can also be used to any other suitable resource-consuming services/applications, without any limitation.

FIG. 1 illustrates an example wireless mobile communication system 100 in which embodiments of the disclosure may be implemented.

As shown in FIG. 1, the wireless mobile communication system 100 comprises a mobile core network 110 and a radio access network 120. The mobile core network 110 comprises different network elements/function entities to perform data transmission and management functions. In the radio access network 120, data traffic is transmitted to end users via the air interface between base stations and user equipment.

According to one or more embodiments of the present disclosure, the wireless mobile communication system 100 further comprises a mobile network operation data analyzing engine 130, configured to perform mobile network operation data analysis based on methods of the Big Data Analysis (BDA) and Machine-Learning/Artificial-Intelligence (AI) and provide decision information for network elements in both the mobile core network 110 and the radio access network 120.

An MNO may be in charge of the mobile core network 110 and the radio access network 120 to provide the data transmitting services to ICPs and end users according to their ordered requirements. The main concern of the MNO is to maximize the usage of the limited network resources and to provide the customer satisfied service efficiently. According to various embodiments of the present disclosure, the MNO can proactively transmit resource-consuming services such as mVoD in an appropriate time by means of more suitable methods so as to improve spectrum efficiency.

The BDA and AI method would be used to help the MNO to generate some proactive optimization strategy for service data transmission. The MNO may require different types of data from the various sources, such as user equipment ability information, user behavior information, network status information (such as traffic.), wireless environment information, network deployment information, and etc. All this information can be used to generate the valuable decision assistant factors for helping the network to be more intelligent to perform some optimization processing. The ICPs and end users are all the costumers to the MNO. Therefore, the MNO need to optimize the wireless mobile communication system 100 to balance the interests of the ICPs and end users, in the meanwhile, improve the efficiency of the system 100.

An ICP server 140 is shown in FIG. 1 which may be used to schematically represent the party of ICP. Take mVoD services as an example, the ICP server 140 may provide the mVoD services, control and manage the application level data information. The video service content data is transmitted to the end user through the mobile core network 110 and the radio access network 120 of the wireless mobile communication system 100. Each ICP may have its mobile application installed in the user terminal as the interaction tool and user interface to make contact with the end user directly. Some application level control functions would be performed by the mobile application. Based on its own BDA and AI methods, the ICP server 140 may perform caching strategy to put the cached contents into at least one corresponding cache server 150 which would be at the edge of the mobile core network 110. Since the ICP has the ability to obtain the application level user behavior data, using the BDA and AI methods, the caching strategy can be generated to include the cache content decision, cache server selection, target user for caching content and etc. As described in the above, such caching strategy can greatly save the backhaul resource of the mobile core network 110. That is because, when a user requests the contents, the cached contents will be transmitted from the corresponding caching server 150 which is near to the base station with which the user equipment is communicated. In that way, the redundancy transmission of such contents can be significantly reduced.

End users are the customers of the ICP for the internet contents and also the customers of the MNO for the data transmitting services including not only traditional voice services but also variety mobile Internet data applications. User equipment of End users is installed with mobile applications, which is the tools and interface that the End Users interact with the MNO and ICP. The behavior and processing of user equipment are controlled by the MNO's network and the ICP's mobile application, once the end user has reached agreement with the ICP and the MNO. Under this circumstance, it is possible that the user profile related data are collected by the MNO and ICP and then used as input of BDA/AI analysis (e.g., in the mobile network operation data analyzing engine 130 and the ICP's BDA/AI analysis engine (not shown)) for some optimization strategies. According to one or more embodiments of the present disclosure, the ICP can negotiate with end users for the subscription agreement of proactive pushing service of the mVoD service. Once the end users agree, the MNO can proactively push relevant contents of the ICP to the user equipment. That means, there is no need for the end user to approve before the specific content transmission is performed.

Figure 2:
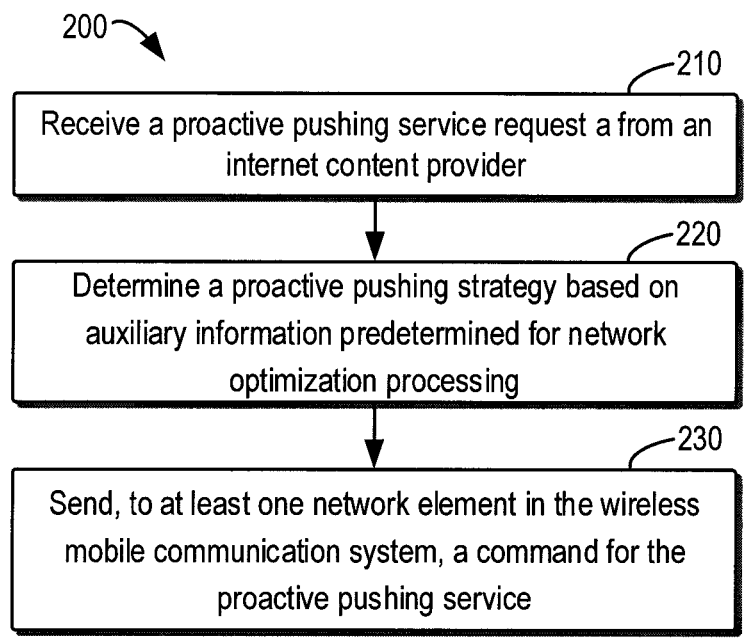
FIG. 2 illustrates a flowchart of a method 200 implemented at a mobile network operation data analyzing engine according to one or more embodiments of the present disclosure.

FIG. 2 illustrates a flowchart of a method 200 implemented at a mobile network operation data analyzing engine according to one or more embodiments of the present disclosure.

At step 210, the mobile network operation data analyzing engine 130 receives a proactive pushing service request from an ICP server, such as the ICP server 140, which provides resource-consuming services, such as mVoD service. The proactive pushing service request from ICP may define the requirements of the service for the subsequent proactive pushing processing.

According to one or more embodiments of the present disclosure, the proactive pushing service request may include following information to define the ICP's requirement:

information relating to contents to be pushed to one or more users. In one implementation, the information may include the identification of content data, the size of the content data, and any other suitable information regarding the contents, which facilitates the subsequent processing of the system.

information relating to one or more users who are willing to accept the proactive pushing service. In one implementation, the ICP only can obtain the user equipment identity such as IMSI or mobile phone number from the application layer. The MNO may use this information to uniquely identify a user in the network.

information relating to scheduling time constraint for the proactive pushing service. In one implementation, the desired pushing time from the application can be indicated. In order to give the flexibility to the network scheduling, the deadline time needs to be long enough for the network autonomously scheduling and transmitting according to the network situation itself.

information relating to a source of the internet contents designated by the proactive pushing service request. In one implementation, the internet contents have been pre-stored in a cache server, such as the cache server 150. The information on the cache server 150 may be identified in the proactive pushing service request so as to find the cached content data. Such information may be the cache server IP address, port number, cached content corresponding to the service or session ID and etc.

Figure 3:
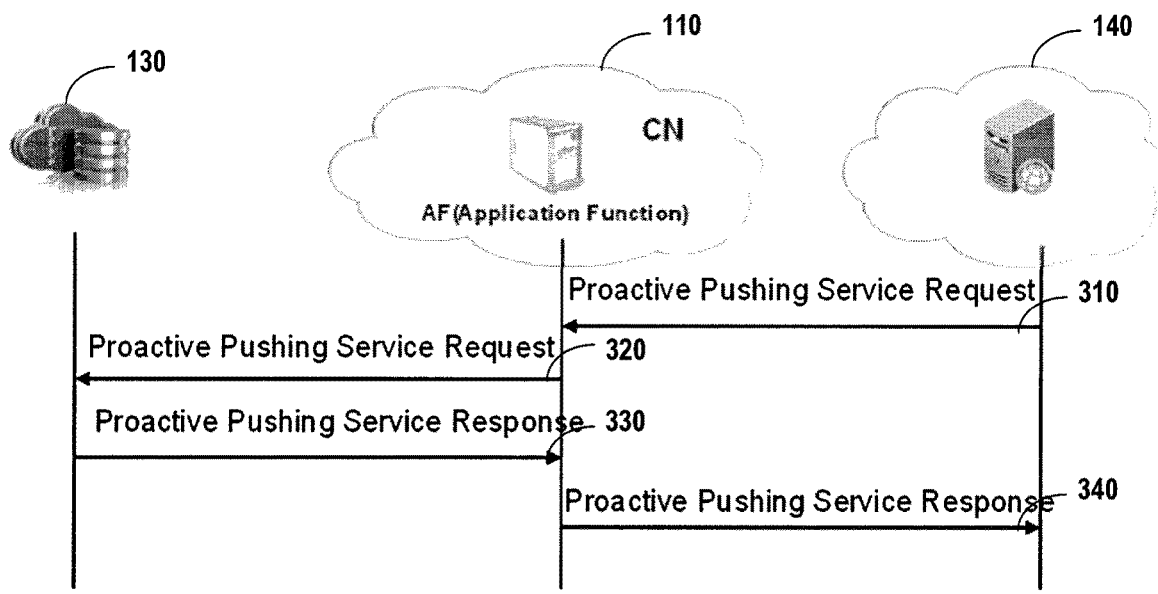
FIG. 3 illustrates a signaling diagram for proactive pushing service request interaction procedure according to one or more embodiments of the present disclosure.

A new signaling interaction procedure may be defined for interacting the proactive pushing service request between the ICP and the MNO. FIG. 3 illustrates a signaling diagram for proactive pushing service request interaction procedure according to one or more embodiments of the present disclosure. In the embodiment of FIG. 3, a 5G network architecture is considered as an example. As shown in FIG. 3, the ICP server 140 may be communicated with an Application Function (AF) entity of the mobile core network 110. Specifically, at step 310, the ICP server 140 may send a proactive pushing service request to the AF entity of the mobile core network 110. The AF entity may process the request accordingly and then forward, at step 320, it directly or indirectly to the mobile network operation data analyzing engine 130. As an response, the mobile network operation data analyzing engine 130 sends a proactive pushing service response 330 via the AF entity, which then forwards, in step 330, the response to the ICP server 140 to inform it that the proactive pushing service request is accepted by the MNO.

Return to FIG. 2. At step 220, the mobile network operation data analyzing engine 130 determines, for the proactive pushing service request, a proactive pushing strategy based on auxiliary information predetermined for network optimization processing.

According to one or more embodiments of the present disclosure, the mobile network operation data analyzing engine 130 may collect information from a core network and/or a radio access network of the wireless mobile communication system. Based on the collected information, the mobile network operation data analyzing engine 130 may perform the network optimization processing. In one or more implementations, the network optimization processing may include at least one of network traffic analysis; user behavior analysis; radio environment analysis; service request analysis.

Figure 4:
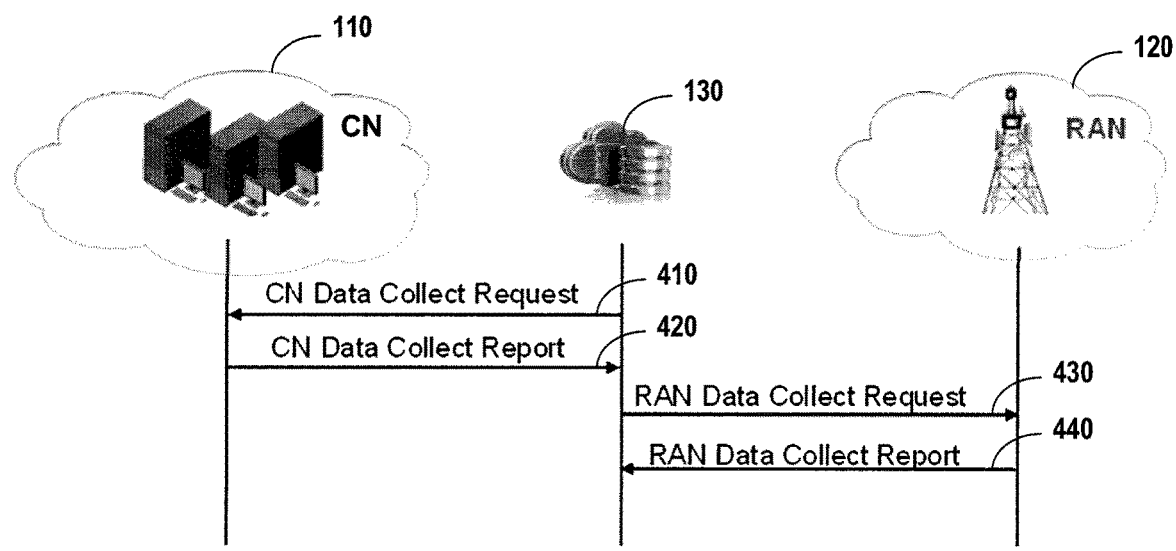
FIG. 4 illustrates a signaling diagram for collecting mobile network operation data according to one or more embodiments of the present disclosure.

The mobile network operation data analyzing engine 130 needs to continuously collect the various large amounts of data from the both the mobile core network 110 and the radio access network 120. The detailed requirements of data collection may be indicated in a data collect request message to the corresponding network element/function entity. And in a data collect report message, the related network elements/function entities would report the required data to the mobile network operation data analyzing engine 130. FIG. 4 illustrates a signaling diagram for collecting mobile network operation data according to one or more embodiments of the present disclosure. As shown in FIG. 4, at step 410, the mobile network operation data analyzing engine 130 may send a mobile core network data collect request to any suitable network elements/function entities of the mobile core network 110. In response to the mobile core network data collect request, the corresponding network element(s)/function entity(ies) can feed back, at step 420, a mobile core network data collect report, which contains the information requested by the mobile network operation data analyzing engine 130. One the other hand, the mobile network operation data analyzing engine 130 may send, at step 430, a radio access network data collect request to any suitable network elements/function entities of the radio access network 120. In response to the radio access network data collect request, the corresponding network element(s)/function entity(ies) can feed back, at step 440, a radio access network data collect report, which contains the information requested by the mobile network operation data analyzing engine 130.

To meet the proactive pushing service requirements, the mobile network operation data analyzing engine 130 may have corresponding BDA/AI processing function modules, which perform the related big data analysis and output the results for the network optimization processing.

In one implementation, the mobile network operation data analyzing engine 130 may comprise a network traffic analysis module, configured to analyze the traffic information in the network and work out the prediction results of the traffic variation in the time/region dimension, such as a traffic map of the wireless mobile communication system 100. The mobile network operation data analyzing engine 130 may use these traffic prediction results to determine the appropriate way for proactive pushing the cached data, including an appropriate transmitting method, time for transmitting and the transmitting region corresponding to the location and coverage of the related base stations, and etc. According to one or more embodiments of the present disclosure, the appropriate transmitting method may be selected from a group including broadcast transmission, multicast transmission, and unicast transmission.

In one implementation, the mobile network operation data analyzing engine 130 may comprise a user behavior analysis module, which is configured to analyze the user behavior in the network. The user behavior analysis module may form the user's profile which may include user equipment capability (screen resolution, application buffer size, radio access ability and etc.), the range and trajectory of the user's activity, user's service subscription information, and etc. The mobile network operation data analyzing engine 130 may use this information to determine the proactive pushing strategy such as an appropriate transmitting method, transmitting area, the size of the content data for proactive pushing service and etc.

Additionally or alternatively, the mobile network operation data analyzing engine 130 may comprise a radio environment analysis module, configured to generate the radio propagation map, for example, according to the historical statistic data of the radio signal quality and the geographic location information. It could reflect the radio environment status for the user location. The mobile network operation data analyzing engine 130 may use this information to predict the quality of the wireless channel that a user can obtain in its activity area and do some proactive scheduling scheme to optimize the data transmission in the wireless mobile communication system 100.

Additionally or alternatively, the mobile network operation data analyzing engine 130 may comprise a service request analysis module, which is configured to collect the service requests from ICPs providers, through time. The mobile network operation data analyzing engine 130 can further profile the service and its provider, and in the future all this information may lead to different pricing strategy, for example. This information could also be used in user profiling.

According to one or more embodiments of the present embodiments, the mobile network operation data analyzing engine 130 may iterate the network optimization processing by self-learning mechanism to obtain improved optimization results. In one embodiment, all the analysis function modules as described above may work base on the collected data and continue to iterate optimization through self-learning to improve the accuracy of the processing results.

Based on the BDA/AI analysis results from the one or more analysis modules, the mobile network operation data analyzing engine 130 may determine at least one item of a group including: one or more transmitting methods by which the at least part of the internet contents designated by the proactive pushing service request are transmitted to the one or more users designated by the proactive pushing service request; one or more network coverages where the proactive pushing service is to be performed; time scheduling information by which relevant network elements initiate transmissions for the proactive pushing service; and/or a content size of the at least part of the internet contents to be proactively pushed to the one or more users.

To be more specific, based on the BDA/AI analysis results from the one or more analysis modules, the mobile network operation data analyzing engine 130 may select the proper time to do the proactive pushing at the time of relatively light network load which refers to the traffic prediction results within the traffic map and the requested deadline information. The mobile network operation data analyzing engine 130 may select the appropriate transmitting method such as multicast so as to save air interface resource according to the user distribution status, user equipment capability, etc. The mobile network operation data analyzing engine 130 may also determine the size of the cached data for proactive pushing based on the user profile info and radio propagation map info to achieve the trade-off among the capacity, cost and quality of experience (QoE).

It should be appreciated that in response to the mobile network operation data analyzing engine 130 determines a transmitting method, a corresponding data transmission procedure needs to be initiated in the radio access network 120. In some embodiments, it is also possible that for one proactive pushing service request, there are multiple different transmitting methods and corresponding communication procedures performed in the system 100 according to the BDA/AI assisted decision results.

Referring to FIG. 2 again, at step 230, the mobile network operation analysis engine 130 sends, to at least one network element in the wireless mobile communication system, a command for the proactive pushing service so that at least a part of internet contents designated by the proactive pushing service request are proactively pushed to one or more users based on the determined proactive pushing strategy.

In order to maximize the use of the radio resource, the MNO is intended to carry out in a way of multicast, for example, to transmit the appropriate size of data to the user in the range of the user distributed base station coverage area at the relative light network load time. According to one or more embodiment of the present disclosure, in response to determining that that one or more transmitting methods are multicast transmission, the mobile network operation data analyzing engine 130 sends, to a Broadcast Multicast Service Centre (BMSC), a proactive multicast pushing command so that the at least part of the internet contents designated by the proactive pushing service request are proactively pushed by means of multimedia broadcast-multicast service. The mobile core network 110 and radio access network 120 execute the proactive pushing strategy according to its received command for the proactive pushing service, such as a proactive multicast pushing command from the mobile network operation data analyzing engine 130.

Figure 5:
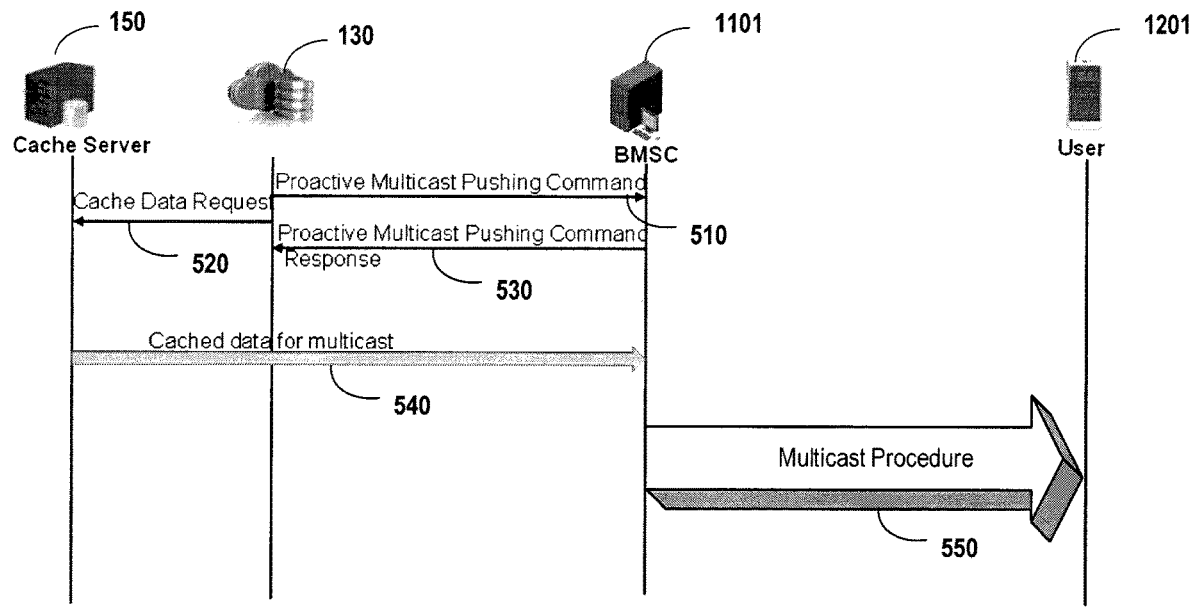
FIG. 5 illustrates a signaling diagram for a proactive multicast pushing procedure according to one or more embodiments of the present disclosure.

FIG. 5 illustrates a signaling diagram for a proactive multicast pushing procedure according to one or more embodiments of the present disclosure.

As shown in FIG. 5, for the control plane, the mobile network operation data analyzing engine 130 sends, at step 510, a proactive multicast pushing command to the BMSC 1101 of the mobile core network 110, which is the network element initiating the multicast service in the wireless mobile communication network. In response to the command, the BMSC 1101 may return, at step 530, a proactive multicast pushing command response. According to the proactive multicast pushing command from the mobile network operation data analyzing engine 130, the BMSC should generate the corresponding multicast session and Multimedia broadcast-multicast service (MBMS) transmission area linking to the proper base station. Each MBMS service session corresponds to one multicast data pushing procedure. Access and Mobile Management Function (AMF)/MBMS Coordination Entity (MCE) as the control plane function nodes in the network may perform the multicast service control to direct the proactive pushing of the content data with the Multicast-broadcast single-frequency network (MBSFN) manner.

According to one or more embodiments, for the user plane, the mobile network operation data analyzing engine 130 may send, at step 520, to one or more content cache servers of the ICP, a content data request to prepare the at least part of the internet contents to be proactively pushed by means of multimedia broadcast-multicast service. As described above, the information identified the one or more cache servers may be contained in the proactive pushing service request informed from the ICP server 140 to the mobile network operation data analyzing engine 130. The cache server 150 at the edge of the mobile core network 110 serves as a content source. The cache server 150 may transfer, at step 540, the cached data for multicast to the BMSC 1101 according to current MBSFN procedure definition. In step 550, the BMSC 1101 initiates the multicast procedure according to the current defined communication procedure. For example, User Plane Function/MBMS Gateway (not shown) as the user plane function entity in the mobile network is responsible to route the multicast cached data to the proper base station (not shown) according to the corresponding MBSFN area. Then the base station can perform the multicast MBSFN transmitting in the air interface so as to send the data to the users.

The application in the related user equipment 1201 will initiate the multicast service receiving function as a background service, to silently receive the multicast pushed data as expected. After the expected cached data multicast transmission is finished, the BMSC 1101 will initiate the corresponding MBMS session stop procedure to terminate this multicast pushing procedure.

Once the user interacts with the ICP's application installed in the user equipment 1201 and decides to watch the expected video program, for which at least part of contents has been pre-stored in the user equipment 1201, the user equipment 1201 can decode and play the pre-stored internet contents received via the proactive pushing service.

With the proactive pushing service, pre-stored content data would be pushed to the user equipment in advanced. It can guarantee that once the user is actually on demand the target video, there would be already the content data in the user equipment's buffer waiting for decoding and playing.

This will greatly reduce the user watching waiting time and improve the user experience. It also has the benefit to the subsequent scheduling of data transmitting when user is on demand watching. The network has the more flexibility due to the pre-loaded data existing in the buffer of user equipment. With multicast transmission of at least part of internet contents of ICPs, it can maximize the usage of the radio resource at the light load time and to maximize the network profit.

The wireless propagation environment would impact the actual data transmitting rate in the air interface. Another QoE related aspect is the amount of received data for watchable time decoded by the video player. Since at least part of content data is pre-stored in the user equipment's buffer, there will be more time for decoding and playing newly received content data, without interruption due to lack of data. In one or more embodiments of the present disclosure, using the BDA/AI analysis results of user specific radio propagation environment information, user equipment capability, user moving trajectory prediction and the video decoder requirement and etc., the MNO can control the proper data size and data transmission rate to cache the data for the user. It may guarantee the data in the user equipment to ensure that there is always the data ready in the buffer when video decode and play through the pre-caching mechanism. This may avoid the interruption and minimize the influence of potential network problem during user watching time and thus improve the QoE. Additionally or alternatively, the user mobility trajectory prediction combining with the radio environment map information may also be used for the base station scheduler to perform some proactive scheduling to against the impact of wireless channel environment changes to the user experience of video service watching.

According to one or more embodiments of the present disclosure, the mobile network operation data analyzing engine 130 may work out scheduling assistant information to assist the subsequent content transmission in response to the user's actual demand on the internet contents. In one or more embodiments of the present disclosure, the mobile network operation data analyzing engine 130 may send scheduling assistant information to related one or more transmission scheduling elements of the radio access network to assist one or more transmission scheduling elements to perform appropriate scheduling by selecting appropriate time resources, frequency resources and/or modulation and code schemes. In one implementation, the scheduling assistant information includes the radio environment information and video decoder requirement information to the base station scheduler for its scheduling of the appropriate time resources, frequency resources and/or modulation and code schemes.

Figure 6:
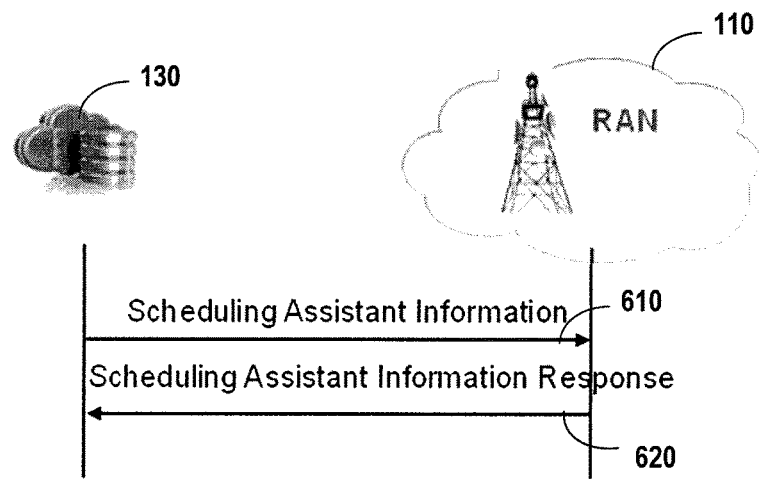
FIG. 6 illustrates a signaling diagram for scheduling assistance information interaction procedure according to one or more embodiments of the present disclosure.

FIG. 6 illustrates a signaling diagram for scheduling assistance information interaction procedure according to one or more embodiments of the present disclosure. As shown in FIG. 6, at step 610, the mobile network operation data analyzing engine 130 may send a message containing scheduling assistant information to an appropriate network element of the radio access network 110. In one implementation, the network element of the radio access network 110 may be a base station scheduler. As a response, the network element of the radio access network 110 may feed back, at step 620, a response message for scheduling assistant information. In one embodiment, the scheduling assistant information may be UE specific.

Once the user interacts with the ICP's application installed in the user equipment 1201 and decides to watch the expected video program, for which at least part of contents has been pre-stored in the user equipment 1201, an application layer request for the subsequent on-demand video data transmitting would be transferred to the ICP server 140. Then ICP server 140 may generate the downlink data transmission service request to the mobile network via the AF entity in the control plane and corresponding user plane data transfer request to the cache server 150, which maintains the pre-cached data information. In the context of 5G, the mobile core network elements Session Management Function (SMF)/Access and Mobility Management Function (AMF) and User Plane Function (UPF) would deal with the related Control Plane/User Plane processing of this user's service by using the scheduling assistant information provided by the mobile network operation data analyzing engine 130. The main difference is that the pre-buffered data information of this content service (mVoD, for example) may be carried from user equipment's APP to the ICP server 140 then to the cache server 150, which would be used for the subsequent data transmission to ensure the data continuity.

In general, the base station would use the unicast to do the user specific transmitting due to the personalized on-demand requirement of each user. The base station scheduler may select the proper time/frequency resource and modulation coding scheme with the help of scheduling assistant information from the mobile network operation data analyzing engine 130. With the radio environment information and the video decoder requirement, the base station scheduler may determine the proper data rate for a proper size of data to be cached. It should better achieve the trade-off among the data size, data rate, transmitting time and video decoder requirement, which can guarantee the always data ready for the video player decoding. On the other hand, combining with the user mobility trajectory prediction, the base station scheduler can get the information about the user potential wireless channel quality. This can help the base station scheduler to carry out some proactive scheduling strategy to improve the average data transmission rate and to avoid the interruption of video decoding data. For example, to compensate the inevitable relatively poor wireless channel environment, the base station scheduler may proactively schedule more data at the better channel condition along user's trajectory. The user's behavior of on-demand watching is personalized and uncertain. The radio environment for each user is also different. So the scheduling results may be user specific. To improve the user experience, the target here is to transmit the most appropriate size of data to the user for caching according to its radio environment to ensure the performance of video decoding.

Figure 7:
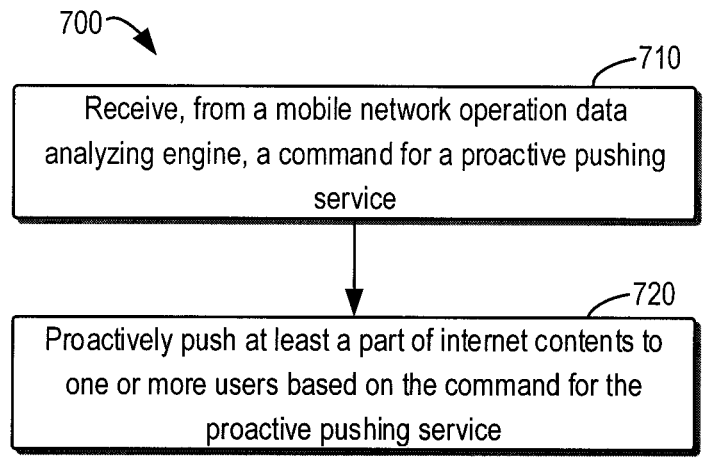
FIG. 7 illustrates a flowchart of a method 700 implemented at a network device according to one or more embodiments of the present disclosure.

FIG. 7 illustrates a flowchart of a method 700 implemented at a network device according to one or more embodiments of the present disclosure.

As shown in FIG. 7, at step 710, the network device of the mobile core network 110 receives, from a mobile network operation data analyzing engine 130, a command for a proactive pushing service. In one or more embodiments of the present disclosure, the network device may be a BMSC of the mobile core network 110. In response to the command, the network device may proactively push, at step 720, at least a part of internet contents to one or more users based on the command for the proactive pushing service. The command sent by the mobile network operation data analyzing engine 130 is in compliance with a proactive pushing strategy determined based on auxiliary information predetermined for network optimization processing.

According to one or more embodiments of the present disclosure, a network device of the mobile core network 110 or the radio access network 120 may receive a scheduling assistant information from the mobile network operation data analyzing engine 130. The network device receiving and utilizing the scheduling assistant information may be any suitable network elements in both the mobile core network 110 and the radio access network 120. In response to a request for the internet contents from a user, the network device may performs appropriate scheduling for transmitting internet contents requested by the user at least based on the scheduling assistant information by selecting appropriate time resources, frequency resources and/or modulation and code schemes. The network device may be a base station scheduler.

Figure 8:
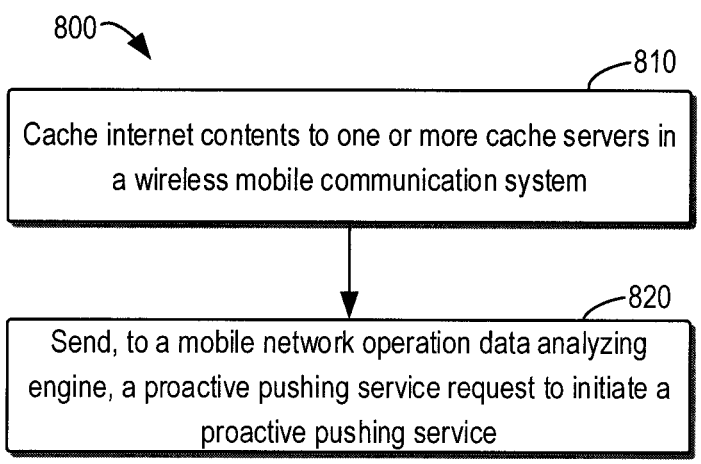
FIG. 8 illustrates a flowchart of a method 800 implemented at a device of an internet content provider according to one or more embodiments of the present disclosure.

FIG. 8 illustrates a flowchart of a method 800 implemented at a device of an internet content provider according to one or more embodiments of the present disclosure.

As shown in FIG. 8, at step 810, the device of the ICP, such as the ICP server 140, caches internet contents to one or more cache servers 150 in a wireless mobile communication system. At step 820, the ICP server 140 sends, to a mobile network operation data analyzing engine 130 of the wireless mobile communication system 100, a proactive pushing service request to initiate a proactive pushing service.

According to one or more embodiments of the present disclosure, in response to a content data request for a proactive pushing service, at least one of the one or more cache servers may provide the at least part of the internet contents to be proactively pushed by means of multimedia broadcast-multicast service.

According to one or more embodiments of the present disclosure, the proactive pushing service request may include: information relating to contents to be pushed to one or more users; information relating to one or more users who are willing to accept the proactive pushing service; information relating to scheduling time constraint for the proactive pushing service; information relating to a source of the internet contents designated by the proactive pushing service request.

In some embodiments, an apparatus capable of performing the method 200 (for example, the mobile network operation data analyzing engine 130) may comprise means for performing the respective steps of the method 200. Means may be implemented in any suitable form. For example, means may be implemented in a circuitry or software module.

In some embodiments, the apparatus comprises: mean for receiving a proactive pushing service request from an internet content provider; means for determining, for the proactive pushing service request, a proactive pushing strategy based on auxiliary information predetermined for network optimization processing; and means for sending, to at least one network element in the wireless mobile communication system, a command for the proactive pushing service so that at least a part of internet contents designated by the proactive pushing service request are proactively pushed to one or more users based on the determined proactive pushing strategy.

In some embodiments, the apparatus may further comprise: means for collecting information from a core network and/or a radio access network of the wireless mobile communication system; means for performing the network optimization processing based on the collected information, wherein means for performing the network optimization processing comprises means for performing at least one of: network traffic analysis; user behavior analysis; radio environment analysis; service request analysis.

In some embodiments, means for performing the network optimization processing may comprise: means for iterating the network optimization processing by self-learning mechanism to obtain improved optimization results.

In some embodiments, the proactive pushing service request may include: information relating to contents to be pushed to one or more users; information relating to one or more users who are willing to accept the proactive pushing service; information relating to scheduling time constraint for the proactive pushing service; information relating to a source of the internet contents designated by the proactive pushing service request.

In some embodiments, means for determining, for the request, a proactive pushing strategy may comprise means for determining at least one item of a group including: one or more transmitting methods by which the at least part of the internet contents designated by the proactive pushing service request are transmitted to the one or more users designated by the proactive pushing service request; one or more network coverages where the proactive pushing service is to be performed; time scheduling information by which relevant network elements initiate transmissions for the proactive pushing service; a content size of the at least part of the internet contents to be proactively pushed to the one or more users.

In some embodiments, the one or more transmitting methods may be selected from a group including broadcast transmission, multicast transmission, and unicast transmission.

In some embodiments, in response to determining that that one or more transmitting methods are multicast transmission, means for sending, to at least one network element in the wireless mobile communication system, a command for the proactive pushing service may comprise means for sending, to a Broadcast Multicast Service Centre, a proactive multicast pushing command so that the at least part of the internet contents designated by the proactive pushing service request are proactively pushed by means of multimedia broadcast-multicast service.

In some embodiments, the apparatus may further comprise means for sending, to one or more content cache servers of the internet content provider, a content data request to prepare the at least part of the internet contents to be proactively pushed by means of multimedia broadcast-multicast service.

In some embodiments, the apparatus may further comprise means for sending scheduling assistant information to related one or more transmission scheduling elements of the radio access network to assist one or more transmission scheduling elements to perform appropriate scheduling by selecting appropriate time resources, frequency resources and/or modulation and code schemes.

In some embodiments, an apparatus capable of performing the method 700 (for example, the BMSC 1101) may comprise means for receiving, from a mobile network operation data analyzing engine, a command for a proactive pushing service; and means for proactively pushing at least a part of internet contents to one or more users based on the command for the proactive pushing service, wherein the command is in compliance with a proactive pushing strategy determined based on auxiliary information predetermined for network optimization processing.

In some embodiments, an apparatus (for example, a base station scheduler) may comprise means for receiving, from the mobile network operation data analyzing engine, a scheduling assistant information; means for performing, in response to a request for the internet contents from a user, appropriate scheduling for transmitting internet contents requested by the user at least based on the scheduling assistant information by selecting appropriate time resources, frequency resources and/or modulation and code schemes.

In some embodiments, an apparatus capable of performing the method 800 (for example, the ICP server 140) comprises means for caching internet contents to one or more cache servers in a wireless mobile communication system; and means for sending, to a mobile network operation data analyzing engine of the wireless mobile communication system, a proactive pushing service request to initiate a proactive pushing service.

In some embodiments, in response to a content data request for a proactive pushing service, at least one of the one or more cache servers may provide the at least part of the internet contents to be proactively pushed by means of multimedia broadcast-multicast service.

In some embodiments, the proactive pushing service request may include: information relating to contents to be pushed to one or more users; information relating to one or more users who are willing to accept the proactive pushing service; information relating to scheduling time constraint for the proactive pushing service; information relating to a source of the internet contents designated by the proactive pushing service request.

Figure 9:
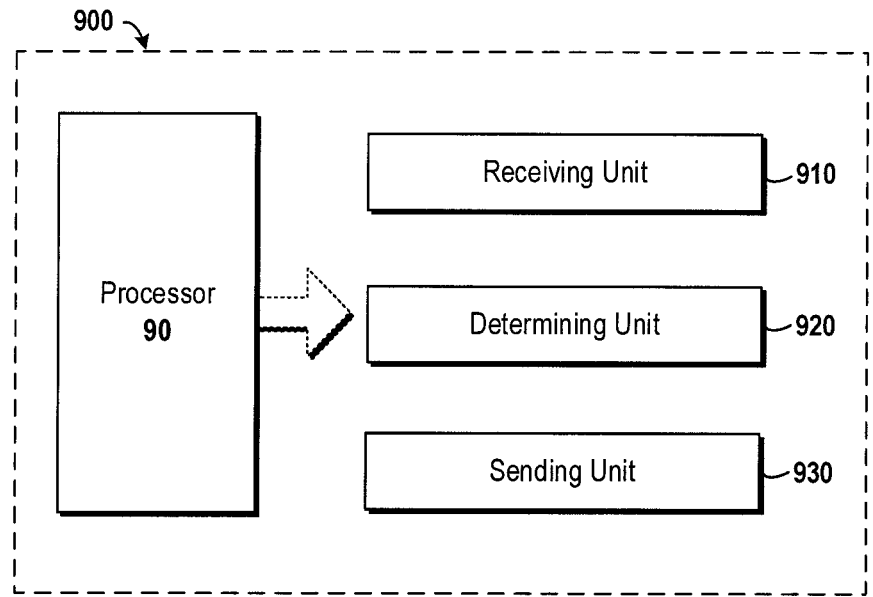
FIG. 9 illustrates a schematic block diagram of an apparatus 900 according to one or more embodiments of the present disclosure.

FIG. 9 illustrates a schematic block diagram of an apparatus 900 by which a mobile network operation data analyzing engine 130 can be implemented according to one or more embodiments of the present disclosure.

As shown in FIG. 9, the apparatus 900 may be embodied as an entity/node/device of the wireless mobile communication system 100 or a virtual machine with functions distributed among different network entities/nodes/devices of the wireless mobile communication system 100 or any other suitable form.

The apparatus 900 comprises a receiving unit 910, a determining unit 920 and a sending unit 930. The receiving unit 910 is configured to receive a proactive pushing service request a from an internet content provider. The determining unit 920 is configured to determine, for the proactive pushing service request, a proactive pushing strategy based on auxiliary information predetermined for network optimization processing. The sending unit 930 is configured to send, to at least one network element in the wireless mobile communication system, a command for the proactive pushing service so that at least a part of internet contents designated by the proactive pushing service request are proactively pushed to one or more users based on the determined proactive pushing strategy. In one or more embodiments of the present disclosure, the proactive pushing service request includes: information relating to contents to be pushed to one or more users; information relating to one or more users who are willing to accept the proactive pushing service; information relating to scheduling time constraint for the proactive pushing service; information relating to a source of the internet contents designated by the proactive pushing service request.

According to one or more embodiments of the present disclosure, the apparatus 900 may further comprise an information collecting unit (not shown in FIG. 9) configured to collect information from a core network and/or a radio access network of the wireless mobile communication system; and a network optimization unit (not shown in FIG. 9), configured to perform the network optimization processing based on the collected information. The network optimization unit may be configured to perform at least one of: network traffic analysis; user behavior analysis; radio environment analysis; service request analysis. According to one or more embodiments of the present disclosure, the network optimization unit may be configured to iterate the network optimization processing by self-learning mechanism to obtain improved optimization results.

According to one or more embodiments of the present disclosure, the determining unit 920 may be configured to determine at least one item of a group including: one or more transmitting methods by which the at least part of the internet contents designated by the proactive pushing service request are transmitted to the one or more users designated by the proactive pushing service request; one or more network coverages where the proactive pushing service is to be performed; time scheduling information by which relevant network elements initiate transmissions for the proactive pushing service; a content size of the at least part of the internet contents to be proactively pushed to the one or more users. In one or more embodiments, the one or more transmitting methods may be selected from a group including broadcast transmission, multicast transmission, and unicast transmission.

According to one or more embodiments of the present disclosure, the sending unit 930 may be configured to: in response to determining that that one or more transmitting methods are multicast transmission, send a proactive multicast pushing command to a Broadcast Multicast Service Centre so that the at least part of the internet contents designated by the proactive pushing service request are proactively pushed by means of multimedia broadcast-multicast service. In some embodiments, the sending unit 930 may be further configured to send, to one or more content cache servers of the internet content provider, a content data request to prepare the at least part of the internet contents to be proactively pushed by means of multimedia broadcast-multicast service.

According to one or more embodiments of the present disclosure, the sending unit 930 may be configured to send scheduling assistant information to related one or more transmission scheduling elements of the radio access network to assist one or more transmission scheduling elements to perform appropriate scheduling by selecting appropriate time resources, frequency resources and/or modulation and code schemes.

The apparatus 900 may comprise a processor 90, which includes one or more microprocessor or microcontrollers, as well as other digital hardware, which may include digital signal processors (DSPs), special-purpose digital logic, and the like. The processor 40 may be configured to execute program code stored in memory (not shown in FIG. 9), which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processor 90 may be used to cause the receiving unit 910, the determining unit 920, the sending unit 930 and any other suitable units of the apparatus 900 to perform corresponding functions according one or more embodiments of the present disclosure.

Figure 10:
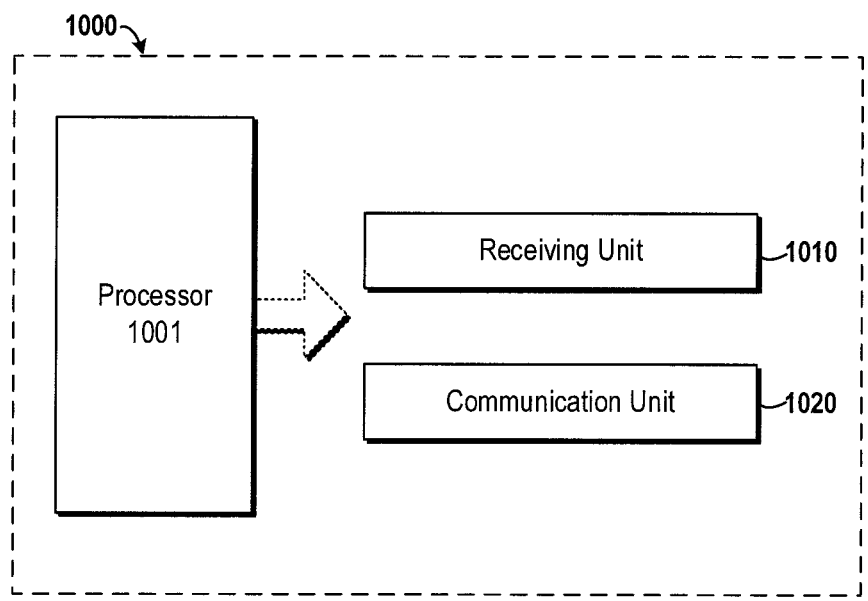
FIG. 10 illustrates a schematic block diagram of an apparatus 1000 implemented as/in a network device in a wireless mobile communication system according to one or more embodiments of the present disclosure.

FIG. 10 illustrates a schematic block diagram of an apparatus 1000 implemented as/in a network device in a wireless mobile communication system according to one or more embodiments of the present disclosure. As shown in FIG. 10, the network device 1000 comprises a receiving unit 1010, a communication unit 1020. The receiving unit 1010 is configured to receive, from a mobile network operation data analyzing engine, a command for a proactive pushing service, where command is in compliance with a proactive pushing strategy determined based on auxiliary information predetermined for network optimization processing. The communication unit 1020 is configured to proactively push at least a part of internet contents to one or more users based on the command for the proactive pushing service.

According to one or more embodiments of the present disclosure, the apparatus 1000 may comprise a further receiving unit (not shown in FIG. 10), which may be configured to receive, from the mobile network operation data analyzing engine, a scheduling assistant information; and a scheduling unit, configured to, in response to a request for the internet contents from a user, perform appropriate scheduling for transmitting internet contents requested by the user at least based on the scheduling assistant information by selecting appropriate time resources, frequency resources and/or modulation and code schemes.

The apparatus 1000 may comprise a processor 1001, which includes one or more microprocessor or microcontrollers, as well as other digital hardware, which may include digital signal processors (DSPs), special-purpose digital logic, and the like. The processor 1001 may be configured to execute program code stored in memory (not shown in FIG. 10), which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processor 1001 may be used to cause the receiving unit 1010, the communication unit 1020, and any other suitable units of the apparatus 1000 to perform corresponding functions according one or more embodiments of the present disclosure.

Figure 11:
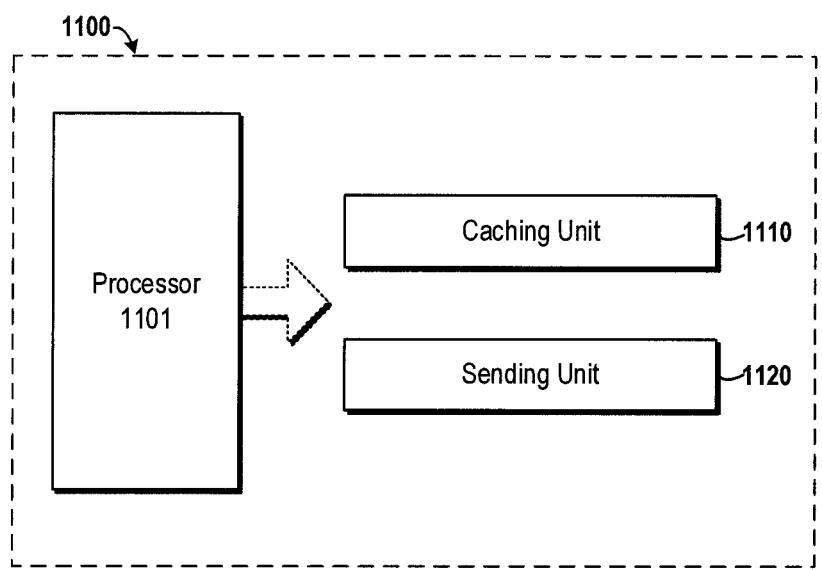
FIG. 11 illustrates a schematic block diagram of an apparatus 1100 implemented at an Internet content provider according to one or more embodiments of the present disclosure.

FIG. 11 illustrates a schematic block diagram of an apparatus 1100 implemented at an Internet content provider according to one or more embodiments of the present disclosure.

As shown in FIG. 11, the apparatus 1100 comprises a caching unit 1110 and a sending unit 1120. The caching unit 1110 is configured to cache internet contents to one or more cache servers in a wireless mobile communication system. The sending unit 1120 is configured to send, to a mobile network operation data analyzing engine of the wireless mobile communication system, a proactive pushing service request to initiate a proactive pushing service. In one or more embodiments of the present disclosure, the proactive pushing service request includes: information relating to contents to be pushed to one or more users; information relating to one or more users who are willing to accept the proactive pushing service; information relating to scheduling time constraint for the proactive pushing service; information relating to a source of the internet contents designated by the proactive pushing service request.

According to one or more embodiments of the present disclosure, a user equipment comprises a service subscribing interface configured to subscribe a proactive pushing service from an internet content provider; and a receiving unit configured to receive at least a part of internet contents via the proactive pushing service, where the at least part of internet contents of the proactive pushing service are processed and transmitted based on one of various embodiments of the present disclosure.

Figure 12:
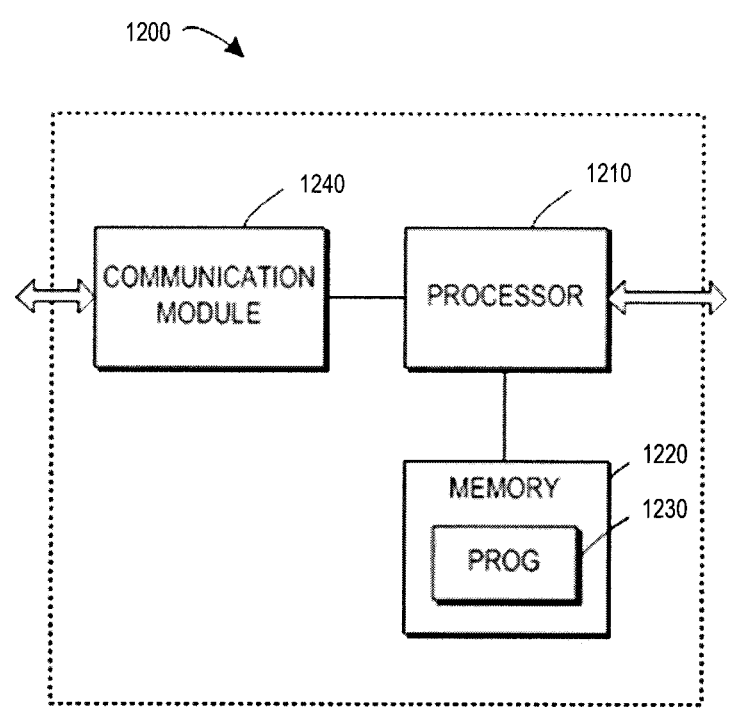
FIG. 12 illustrates a simplified block diagram of an apparatus 1200 that may be embodied as/in a device according to one or more embodiments of the present disclosure.

FIG. 12 is a simplified block diagram of a device 1200 that is suitable for implementing embodiments of the present disclosure. The device 1200 can be implemented at or as at least a part of the apparatuses according to one or more embodiments of.

As shown, the device 1200 includes a processor 1210, a memory 1220 coupled to the processor 1210, a communication module 1240 coupled to the processor 1210, and a communication interface (not shown) coupled to the communication module 1240. The memory 1210 stores at least a program 1230. The communication module 1240 is for bidirectional communications. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a UE.

The program 1230 is assumed to include program instructions that, when executed by the associated processor 1210, enable the device 1200 to operate in accordance with the embodiments of the present disclosure, as discussed herein with reference to FIGS. 2-8. The embodiments herein may be implemented by computer software executable by the processor 1210 of the device 1200, or by hardware, or by a combination of software and hardware. The processor 1210 may be configured to implement various embodiments of the present disclosure.

The memory 1210 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1210 is shown in the device 1200, there may be several physically distinct memory modules in the device 1200. The processor 1210 may be of any type suitable to the local technical network, and may include one or more of general purpose computers, special purpose computers, microprocessors, digital signal processors (DSPs) and processors based on multicore processor architecture, as non-limiting examples. The device 1200 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method according to any one of the embodiments of the present disclosure. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable media.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method implemented in a wireless mobile communication system, comprising:
    receiving a proactive pushing service request from an internet content provider;
    determining, for the proactive pushing service request, a proactive pushing strategy based on auxiliary information predetermined for network optimization processing; and
    sending, to at least one network element in the wireless mobile communication system, a command for the proactive pushing service so that at least a part of internet contents designated by the proactive pushing service request are proactively pushed to one or more users based on the determined proactive pushing strategy.

2. The method according to claim 1, further comprising:
    collecting information from a core network or a radio access network of the wireless mobile communication system;
    performing the network optimization processing based on the collected information,
    wherein performing the network optimization processing comprises iterating the network optimization processing by self-learning mechanism to obtain improved optimization results, and performing at least one of:
    network traffic analysis;
    user behavior analysis;
    radio environment analysis;
    service request analysis.

3. The method according to claim 1, wherein the proactive pushing service request includes:
    information relating to contents to be pushed to one or more users;
    information relating to one or more users who are willing to accept the proactive pushing service;
    information relating to scheduling time constraint for the proactive pushing service;
    information relating to a source of the internet contents designated by the proactive pushing service request.

4. The method according to claim 2, wherein determining, for the request, a proactive pushing strategy comprises determining at least one item of a group including:
    one or more transmitting methods by which the at least part of the internet contents designated by the proactive pushing service request are transmitted to the one or more users designated by the proactive pushing service request;
    one or more network coverages where the proactive pushing service is to be performed;
    time scheduling information by which relevant network elements initiate transmissions for the proactive pushing service;
    a content size of the at least part of the internet contents to be proactively pushed to the one or more users.

5. The method according to claim 4, wherein the one or more transmitting methods are selected from a group including broadcast transmission, multicast transmission, and unicast transmission, and wherein in response to determining that that one or more transmitting methods are multicast transmission, sending, to at least one network element in the wireless mobile communication system, a command for the proactive pushing service comprises:

sending, to a Broadcast Multicast Service Centre, a proactive multicast pushing command so that the at least part of the internet contents designated by the proactive pushing service request are proactively pushed by a multimedia broadcast-multicast service; and sending, to one or more content cache servers of the internet content provider, a content data request to prepare the at least part of the internet contents to be proactively pushed by the multimedia broadcast-multicast service.

6. A mobile network operation data analyzing engine in a wireless mobile communication system, comprising:

at least one processor; and at least one memory including computer program code;

the at least one memory and the computer program code configured to, with the at least one processor, cause the apparatus at least to receive a proactive pushing service request a from an internet content provider;

determine, for the proactive pushing service request, a proactive pushing strategy based on auxiliary information predetermined for network optimization processing; and send, to at least one network element in the wireless mobile communication system, a command for the proactive pushing service so that at least a part of internet contents designated by the proactive pushing service request are proactively pushed to one or more users based on the determined proactive pushing strategy.

7. The mobile network operation data analyzing engine according to claim 6, wherein the at least one memory and the computer program code are further configured to, with the at least one processor, cause the apparatus at least to:

collect information from a core network or a radio access network of the wireless mobile communication system;

perform the network optimization processing based on the collected information, wherein the network optimization processing includes at least one of:

network traffic analysis;

user behavior analysis;

radio environment analysis;

service request analysis, wherein the network optimization processing is iterated by self-learning mechanism to obtain improved optimization results.

8. The mobile network operation data analyzing engine according to claim 6, wherein the proactive pushing service request includes:

information relating to contents to be pushed to one or more users;

information relating to one or more users who are willing to accept the proactive pushing service;

information relating to scheduling time constraint for the proactive pushing service;

information relating to a source of the internet contents designated by the proactive pushing service request.

9. The mobile network operation data analyzing engine according to claim 7, wherein the wherein the at least one memory and the computer program code are further configured to, with the at least one processor, cause the apparatus at least to determine at least one item of a group including:

one or more transmitting methods by which the at least part of the internet contents designated by the proactive pushing service request are transmitted to the one or more users designated by the proactive pushing service request;

one or more network coverages where the proactive pushing service is to be performed;

time scheduling information by which relevant network elements initiate transmissions for the proactive pushing service;

a content size of the at least part of the internet contents to be proactively pushed to the one or more users, wherein the one or more transmitting methods are selected from a group including broadcast transmission, multicast transmission, and unicast transmission, and wherein the sending comprises, in response to determining that that one or more transmitting methods are multicast transmission, send a proactive multicast pushing command to a Broadcast Multicast Service Centre so that the at least part of the internet contents designated by the proactive pushing service request are proactively pushed by a multimedia broadcast-multicast service, and wherein the at least one memory and the computer program code are further configured to, with the at least one processor, cause the apparatus to send, to one or more content cache servers of the internet content provider, a content data request to prepare the at least part of the internet contents to be proactively pushed by the multimedia broadcast-multicast service.

10. The mobile network operation data analyzing engine according to claim 7, wherein the at least one memory and the computer program code are further configured to, with the at least one processor, cause the apparatus at least to:

send scheduling assistant information to related one or more transmission scheduling elements of the radio access network to assist one or more transmission scheduling elements to perform appropriate scheduling by selecting appropriate time resources, frequency resources or modulation and code schemes.

11. A network device of a wireless mobile communication system comprising a processor and a non-transitory machine readable storage medium, the non-transitory machine readable storage medium containing instructions that, when executed on the processor, cause the network device to perform the method according to claim 1.

12. A computer program embodied on a non-transitory computer-readable medium, said computer program comprising instructions which, when executed on one or more processors, cause the one or more processors to carry out the method according to claim 1.

* * * * *